Aug. 3, 1926.  1,594,356
A. B. DAVIS
INKING ROLL AND METHOD OF AND APPARATUS FOR RENEWING SURFACE OF SAME
Filed August 8, 1923
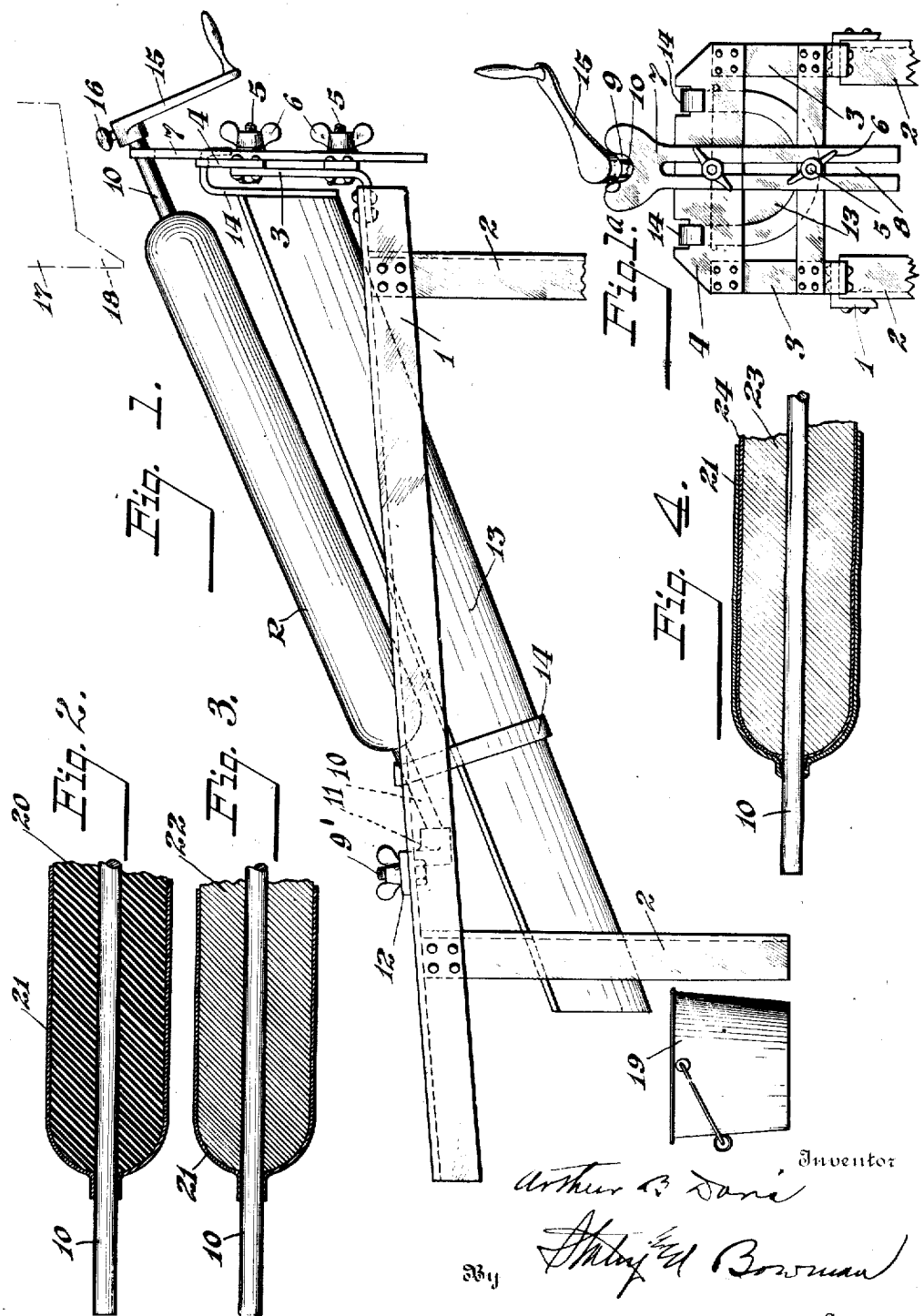

Patented Aug. 3, 1926.

1,594,356

UNITED STATES PATENT OFFICE.

ARTHUR BYRON DAVIS, OF SPRINGFIELD, OHIO.

INKING ROLL AND METHOD OF AND APPARATUS FOR RENEWING SURFACE OF SAME.

Application filed August 6, 1923. Serial No. 656,377.

This invention relates to an improved method of treating the ink rolls of printing presses whereby the surfaces of the rolls may be renewed at a comparatively small cost.

The inking rolls of printng presses when formed of the commercial substance known as roller composition must be frequently renewed because of the fact that the surfaces in a comparatively short time become checked and scored, and in many cases when overheated the body of the roll disintegrates. Rolls made of soft rubber compound have been used to some extent, such rolls having the advantage that they do not expand and contract under weather conditions, as do rolls of roller composition, but these rubber rolls are unsatisfactory because of the fact that the surfaces thereof do not have that nice affinity for ink possessed by roller composition, and for that reason have been used only as ink distributing rolls and not for the inking rolls proper.

I have discovered, however, that soft rubber rolls which have been treated with a thin coating of roller composition, not only possess the advantages of being free from expansion and contraction, but also have the same nice affinity for ink found in the rolls of roller composition, so that a rubber roll so treated may be used satisfactorily for inking rolls as well as for distributing rolls. I have also found that when the roller composition surfaces of such rubber rolls become checked, such surfaces may be renewed at a trifling expense by my improved method.

By my method it is also feasible to treat old roller composition rolls in a way to renew the surface and make such rolls perform the work of inking in a manner as satisfactory as found in a roll, the entire body of composition of which has been renewed in the usual way. I have also found that old roller composition rolls which have been covered with fabric can be similarly treated by applying the coating of composition to the fabric.

Another form of inking roll to which my improved method is applicable is that type of roll which consists of a core of vulcanized oil provided with an outer skin of vulcanized rubber. Such a roll has many of the advantages possessed by a roll made of roller composition and by providing the outer surface of the rubber skin with a thin film of roller composition in accordance with my invention, such a roll possesses all the characteristics of a roll made of roller composition which makes it entirely suitable for an inking roll on printing presses.

It is the object of my invention to treat soft rubber rolls and other similar forms of rolls with roller composition in a way to render such rolls entirely suitable for use as inking rolls in presses for high class work, and to be able to renew the surfaces of such rolls from time to time in an inexpensive manner; and it is also a further object of the invention to treat the surfaces of worn rolls of roller composition, or similar rolls covered with fabric, in a way to provide them with an entirely new surface of roller composition which will perform the work of inking in a manner as satisfactory as rolls which have had the composition entirely renewed.

A further and more specific object is to provide a method of the character referred to by which a light coating of roller composition may be applied to inking rolls by subjecting the rolls to the composition in heated liquid form and allowing the composition to freely drain from the rolls so as to leave deposited on the rolls but a comparatively thin film of the composition which may be readily removed when worn by subjection to heated water and the roll recoated.

A further object of the invention is to devise a method for the purpose described which will enable me to employ apparatus of simple and cheap construction for carrying out the method.

Referring to the accompanying drawings:—

Fig. 1 is a side elevation of one form of apparatus which I employ in carrying out my invention.

Fig. 1ª is an end view of the apparatus.

Fig. 2 is a longitudinal section of a portion of a rubber roll treated according to my improved method.

Fig. 3 is a longitudinal section of a portion of a roll of rubber composition likewise treated.

Fig. 4 is a longitudinal section of a portion of a roll of rubber composition covered with fabric which has been treated by my method.

Referring to the drawings, 1 represents a suitable frame supported on legs 2. At one end of this frame is secured a pair of uprights 3 connected by cross-bars 4 to which is adjustably connected by bolts 5 and their wing nuts 6 a central support 7; this support having a slotted opening 8 through which the bolts extend whereby the height of the support may be regulated. This support 7 has at its upper end a bearing 9 to receive the upper end of the shaft 10 of a roll R, the lower end of the shaft being supported in a bearing 11 projecting from a supporting member 12 which is adjustably connected with the frame by bolts 9' which project through the horizontal web of the side members of the frame, which are preferably of angle iron; the web of each side member being provided with a series of openings (not shown) by which the bearing member 11 may be adjusted to or from the supporting member 7 so as to accommodate rolls of different lengths. A trough 13 having strips 14 is supported from the side members of the frame and the upper cross-bar respectively.

The bearings 9 and 11 are so positioned as to height as to give to the roll which has been placed in position in the apparatus a pronounced tilt or incline, and a crank 15 having a set-screw 16 is connected to the upper end of the shaft 10 of the roll for the purpose of rotating the roll in the bearings.

The roller composition which I employ to treat the rolls is of any well known formula, the principal ingredients of which are glue, molasses, glycerine and venice of turpentine. A formula which I have found satisfactory is as follows: 8½ lbs. Cooper's best lax glue, 2 gallons best unclarified molasses, 1 pint glycerine, and 2 ounces venice of turpentine.

These ingredients are mixed and heated and while in a heated liquid state are poured or flooded upon the roll R from a suitable container 17 which may be in the form of the ordinary sprinkling can with a spout 18. While the molten composition in heated state is being poured, the roll is revolved slowly and the container 17 gradually moved down the roll so as to insure covering the entire surface of the roll with the composition. The major portion of the composition which is poured or flooded upon the roll drains into the trough 13 and runs into a bucket or other receptacle 19 at the lower end of the trough, from whence it may be conveyed back to the heating tank. After the entire surface of the roll has been treated the roll is removed from the apparatus and placed in a rack in a vertical or substantially vertical position for further draining and drying.

As a result of this treatment a very thin film of the roller composition is placed upon the roll surface whether it be the surface of a rubber roll or the surface of a roll of roller composition, either bare or covered with fabric.

In covering a roll of roller composition with fabric one satisfactory method which I have employed is the use of the ordinary friction tape wound about the surface of the roll in a spiral direction, although another method which is equally satisfactory is to draw a stocking of fabric over the surface of the roll.

In Fig. 2 there is illustrated a roll 20 formed of soft rubber compound to which has been applied a film 21 of roller composition. In Fig. 3 a roll 22 of roller composition is shown to which has been directly applied a film of roller composition. In Fig. 4 is shown another roll 23 of roller composition wrapped or otherwise surrounded with fabric 24 and a thin film 21 of roller composition applied to the fabric. For the sake of clearness the thickness of the film of roller composition shown in these figures has been exaggerated. The film of roller composition left upon the roll after draining is very thin compared to the diameter of the roll, a film 30/1000 of an inch in thickness being found satisfactory for the purpose although the thickness of the film will vary somewhat according to the temperature of the heated liquid composition when poured upon or otherwise applied to the roll. It is my intention, however, to heat the composition to such an extent that the major portion thereof will freely drain from the roll when it is flooded thereon leaving but a comparatively thin film of the composition deposited upon the roll.

The ends of the rolls are bevelled or rounded as shown so as to avoid the accumulation of composition at the ends of the rolls and a possible consequent formation of streaks of composition due to the over-flowing of this accumulation.

In some weather conditions it is also desirable to pre-heat the roll before surfacing so as to prevent possible chilling of the composition when applied thereto and before it has an opportunity of properly draining therefrom.

I am aware that it has been proposed to coat soft rubber rolls and also rolls of roller composition with a coating of roller composition, but in all of these attempts so far as I am informed the coating of roller composition is applied by a molding process and is of a comparatively thick character. By my method of flooding the roller composition to the roll in a heated liquid state and then allowing the composition to drain from the roller while in that state, but a comparatively thin film of composition is left upon the roll which answers the purpose as an inking surface equally as well as a thick coating and effects a material saving in the roller composition when renewed which is a very important item in printing establishments employing a large number of presses because of the fact that the waste of the composition upon renewal is with my method comparatively small. Further, with my method, no expensive molds are required, as is true with other methods of coating, it only being necessary to provide a simple form of apparatus suitable to enable the roll to be subjected to the heated liquid composition of a character which will permit the composition to readily drain from the roll, such as the apparatus shown. Other apparatus for accomplishing this result may be employed, however, and it is to be understood that my invention contemplates any method of applying the composition to the rolls which will permit drainage of the composition therefrom so as to leave deposited on the roll but a film or thin coating of composition.

When the composition coating becomes worn, it may be readily removed by subjecting the roll to a bath of hot water, after which a new coating may be applied in the manner described.

This method also has the advantage that the surface of the roller will always be composed of fresh material for the reason that new, fresh composition may be used at a small expense, it having been the practice in renewing old composition rolls by the old method, to use the same material over and over again to save expense.

Having thus described my invention, I claim:—

1. The method of coating an inking roll for recoating or completing said roll, which consists in pouring over the surface of the roll a coating material or composition in a molten state in excess of the amount needed for said coating, and permitting the surplus material to drain from the roll, leaving a film of composition thereon.

2. The method of coating an inking roll for recoating or completing said roll, which consists in pouring over the surface of the roll while in an inclined position a coating material or composition in a molten state in excess of the amount needed for said coating and allowing the surplus composition to drain in an endwise direction from said roll, leaving a film of composition thereon.

3. The method of coating an inking roll for recoating or completing said roll, which consists in pouring over the surface of the roll a coating material or composition in a molten state in excess of the amount needed for said coating, then mounting the roll in a vertical position and allowing the surplus material to drain in an endwise direction from the roll, leaving a film of composition thereon.

4. In an inking roll, a main body of comparatively soft material, an outer coating of roller composition, said outer coating being of a film-like character formed by pouring over the surface of said comparatively soft material a coating composition in a molten state in excess of the amount needed for said coating, and permitting the excess of the composition to drain in an endwise direction from said roll.

5. In an inking roll, a main body of rubber or other non-expansible and non-contractible material, and an outer coating of rubber composition, said outer coating being of a film-like character formed by pouring over the surface of said main body a coating material in a molten state in excess of the amount needed for said coating, the main body being held in an inclined position whereby the surplus composition will drain in an endwise direction from said main body.

6. In an apparatus of the character described, a supporting frame and bearings on said frame for supporting an inking roll whereby said roll may be revolved in said bearings in a position to expose the same to a pouring container for roller composition to permit said composition to be poured thereon, said bearings being arranged so as to support said roll in an inclined position to permit drainage of said composition from said roll, said bearings being also arranged to permit the ready insertion and removal of the rolls therefrom.

7. In an inking roll, a main body of comparatively soft material having its sides rounded, an outer coating of roller composition, said outer coating being of a film-like character formed by pouring over the surface of said main body a coating material in a molten state in excess of the amount needed for said coating, the excess material being allowed to drain from said main body and the rounded ends of the roll preventing the accumulation of said material at those points.

In testimony whereof, I have hereunto set my hand this 20th day of July 1923.

ARTHUR BYRON DAVIS.

of the fact that the waste of the composition upon renewal is with my method comparatively small. Further, with my method, no expensive molds are required, as is true with other methods of coating, it only being necessary to provide a simple form of apparatus suitable to enable the roll to be subjected to the heated liquid composition of a character which will permit the composition to readily drain from the roll, such as the apparatus shown. Other apparatus for accomplishing this result may be employed, however, and it is to be understood that my invention contemplates any method of applying the composition to the rolls which will permit drainage of the composition therefrom so as to leave deposited on the roll but a film or thin coating of composition.

When the composition coating becomes worn, it may be readily removed by subjecting the roll to a bath of hot water, after which a new coating may be applied in the manner described.

This method also has the advantage that the surface of the roller will always be composed of fresh material for the reason that new, fresh composition may be used at a small expense, it having been the practice in renewing old composition rolls by the old method, to use the same material over and over again to save expense.

Having thus described my invention, I claim:—

1. The method of coating an inking roll for recoating or completing said roll, which consists in pouring over the surface of the roll a coating material or composition in a molten state in excess of the amount needed for said coating, and permitting the surplus material to drain from the roll, leaving a film of composition thereon.

2. The method of coating an inking roll for recoating or completing said roll, which consists in pouring over the surface of the roll while in an inclined position a coating material or composition in a molten state in excess of the amount needed for said coating and allowing the surplus composition to drain in an endwise direction from the roll, leaving a film of composition thereon.

3. The method of coating an inking roll for recoating or completing said roll, which consists in pouring over the surface of the roll a coating material or composition in a molten state in excess of the amount needed for said coating, then mounting the roll in a vertical position and allowing the surplus material to drain in an endwise direction from the roll, leaving a film of composition thereon.

4. In an inking roll, a main body of comparatively soft material, an outer coating of roller composition, said outer coating being of a film-like character formed by pouring over the surface of said comparatively soft material a coating composition in a molten state in excess of the amount needed for said coating, and permitting the excess of the composition to drain in an endwise direction from said roll.

5. In an inking roll, a main body of rubber or other non-expansible and non-contractible material, and an outer coating of rubber composition, said outer coating being of a film-like character formed by pouring over the surface of said main body a coating material in a molten state in excess of the amount needed for said coating, the main body being held in an inclined position whereby the surplus composition will drain in an endwise direction from said main body.

6. In an apparatus of the character described, a supporting frame and bearings on said frame for supporting an inking roll whereby said roll may be revolved in said bearings in a position to expose the same to a pouring container for roller composition to permit said composition to be poured thereon, said bearings being arranged so as to support said roll in an inclined position to permit drainage of said composition from said roll, said bearings being also arranged to permit the ready insertion and removal of the rolls therefrom.

7. In an inking roll, a main body of comparatively soft material having its sides rounded, an outer coating of roller composition, said outer coating being of a film-like character formed by pouring over the surface of said main body a coating material in a molten state in excess of the amount needed for said coating, the excess material being allowed to drain from said main body and the rounded ends of the roll preventing the accumulation of said material at those points.

In testimony whereof, I have hereunto set my hand this 20th day of July 1923.

ARTHUR BYRON DAVIS.

DISCLAIMER 1,594,356.—*Arthur Byron Davis*, Springfield, Ohio. INKING ROLL AND METHOD OF AND APPARATUS FOR RENEWING SURFACE OF SAME. Patent dated August 3, 1926. Disclaimer filed July 2, 1938, by the patentee.

Hereby enters this disclaimer to claims 4, 5, 6, and 7 of said specification.

[*Official Gazette August 2, 1938.*]

DISCLAIMER 1,594,356.—*Arthur Byron Davis*, Springfield, Ohio. INKING ROLL AND METHOD OF AND APPARATUS FOR RENEWING SURFACE OF SAME. Patent dated August 3, 1926. Disclaimer filed July 2, 1938, by the patentee.

Hereby enters this disclaimer to claims 4, 5, 6, and 7 of said specification.

[*Official Gazette August 2, 1938.*]